(12) United States Patent
Nakamura et al.

(10) Patent No.: US 7,304,800 B2
(45) Date of Patent: Dec. 4, 2007

(54) OPTICAL TUNABLE FILTER AND METHOD OF MANUFACTURING THE SAME

(75) Inventors: Ryosuke Nakamura, Suwa (JP); Shinichi Kamisuki, Suwa (JP); Akihiro Murata, Suwa (JP); Mitsuhiro Yoda, Suwa (JP)

(73) Assignee: Seiko Epson Corporation (JP)

( * ) Notice: Subject to any disclaimer, the term of this patent is extended or adjusted under 35 U.S.C. 154(b) by 276 days.

(21) Appl. No.: 11/002,441

(22) Filed: Dec. 2, 2004

(65) Prior Publication Data

US 2005/0122191 A1    Jun. 9, 2005

(30) Foreign Application Priority Data

Dec. 3, 2003    (JP)    ............... 2003-405247

(51) Int. Cl.
    *H01P 1/20*    (2006.01)
(52) U.S. Cl. .................. 359/579; 359/587; 359/589
(58) Field of Classification Search .......... 359/578, 359/587, 589, 585
    See application file for complete search history.

(56) References Cited

U.S. PATENT DOCUMENTS

| 6,341,039 | B1 | 1/2002 | Flanders |
|---|---|---|---|
| 6,356,689 | B1 | 3/2002 | Greywall |
| 6,400,738 | B1 | 6/2002 | Tucker et al. |
| 6,438,149 | B1 * | 8/2002 | Tayebati et al. ......... 372/45.01 |

FOREIGN PATENT DOCUMENTS

| JP | 07-243963 | 9/1995 |
|---|---|---|
| JP | 2001-296483 | 10/2001 |
| JP | 2001-311883 | 11/2001 |
| JP | 2002-174721 | 6/2002 |
| JP | 2002-258175 | 9/2002 |
| JP | 2003-084216 | 3/2003 |
| JP | 2003-215473 | 7/2003 |
| WO | WO 03/042729 A13 | 5/2003 |

* cited by examiner

*Primary Examiner*—Fayez G. Assaf
(74) *Attorney, Agent, or Firm*—Harness, Dickey & Pierce, P.L.C.

(57) ABSTRACT

An optical tunable filter is provided including a first substrate having light transmission properties and having a movable part and a supporting member that movably supports the movable part and having a smaller thickness than the movable part, a second substrate having light transmission properties and opposed to the first substrate, a first gap and a second gap provided between the movable part and the second substrate, an interference part causing interference between the movable part and the second substrate through the second gap and a drive member changing an interval of the second gap by moving the movable part to the second substrate by making use of the first gap.

15 Claims, 12 Drawing Sheets

F I G. 1
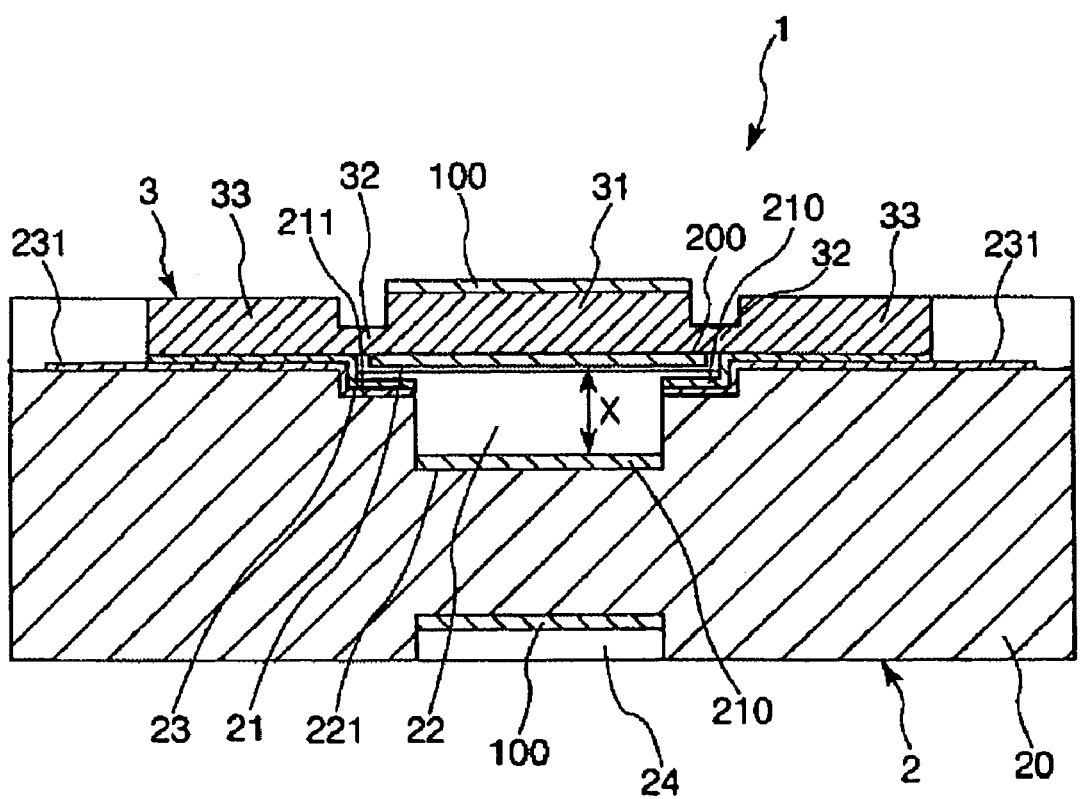

OPTICAL TUNABLE FILTER AND METHOD OF MANUFACTURING THE SAME

RELATED APPLICATIONS

This application claims priority to Japanese Patent Application No. 2003-405247 filed Dec. 3, 2003 which is hereby expressly incorporated by reference herein in its entirety.

BACKGROUND

1. Field of the Invention

The present invention relates to an optical tunable filter and a method of manufacturing the same.

2. Related Art

The following applications relate to the optical tunable filter according to the present invention.

Filter by Surface Micro-machining Technology

In a conventional optical tunable filter, the thickness of a sacrificial layer solely controls the thickness of a variable gap therein. According to this technology, however, the thickness of the sacrificial layer widely varies depending on forming conditions. This can lead to a problem wherein driving becomes unstable because the thickness variation makes a coulomb force (electrostatic force) between a thin film and a drive electrode variable. Furthermore, the thickness of the optical tunable filter is large since a movable part protrudes from a substrate (for example, see Japanese Unexamined Patent Publication No. 2002-174721).

Filter Using SOI Wafer

In U.S. patent document U.S. Pat. No. 6,341,039, a $SiO_2$ layer of a Silicon on Insulator (SIO) wafer is used as the sacrificial layer and forms a variable gap. In this way, the variable gap can be well controlled when it is formed.

However, there is a problem wherein the movable part and the drive electrode can stick to each other when a large electrostatic force is generated. This happens because an insulating structure is not formed between the movable part and the drive electrode (for example, see U.S. Pat. No. 6,341,039).

Problems Shared by the Above-mentioned Filters

At the end of the above manufacturing processes, the sacrificial layer is released and the variable gap is formed. In the formation process, a release hole is needed to introduce a liquid for releasing the sacrificial layer. This decreases an area to which the coulomb force acts which causes a problem in that it increases a drive voltage.

Moreover, when the variable gap is small, a phenomenon wherein the thin film and a drive electrode substrate stick to each other with surface tension of water as the sacrificial layer is released can occur.

Furthermore, when the overall thickness of the optical tunable filter is made thin in order to reduce the drive voltage, an antireflection film formed on the movable part might be warped. Also, the stress induced warping of the high reflection film might occur at the movable part. In addition, there is a problem in that the strength of the optical tunable filter might be reduced.

For these reasons, there is a need for an optical tunable filter in which the movable part can be stably driven with a low voltage and without making the variable gap small.

The present invention has been developed in consideration of the above-mentioned problems, and intended to provide an optical tunable filter in which the movable part can be stably driven with a low voltage and having a simplified structure and manufacturing process as well as being downsized. The present invention also intends to provide a method of manufacturing the same.

SUMMARY

An optical tunable filter of a first aspect of the present invention includes a first substrate having light transmission properties and having a movable part and a supporting member supporting the movable part as the movable part is movable and having a smaller thickness than a thickness of the movable part, a second substrate having light transmission properties and opposed to the first substrate, a first gap and a second gap provided between the movable part and the second substrate, an interference part causing interference between the movable part and the second substrate through the second gap and a drive member changing an interval of the second gap by moving the movable part to the second substrate by making use of the first gap.

In this way, the movable part can be stably driven with a low voltage and structure of the optical tunable filter can be simplified as well as downsized. Furthermore, it is not necessary to provide a release hole and the optical tunable filter can be easily manufactured.

An optical tunable filter of a second aspect of the present invention includes a first substrate having light transmission properties and having a movable part and a supporting member that supports the movable part as the movable part is movable and having a smaller thickness than a thickness of the movable part, a second substrate having light transmission properties and opposed to the first substrate, a first gap and a second gap provided on the second substrate, an interference part causing interference between the movable part and the second substrate through the second gap; and a drive member changing an interval of the second gap by moving the movable part to the second substrate by making use of the first gap.

In this way, structure and manufacturing processes of the optical tunable filter can be simplified as well as downsized since the gap for a space in which the movable part moves and the gap for interference of light are provided on the same substrate. In addition, the movable part can be driven with a low voltage.

In the optical tunable filter, a first concave portion corresponding to the first gap is preferably provided on a face of the second substrate opposed to the movable part. Also, a second concave portion corresponding to the second gap and having a larger depth than a depth of the first concave portion is preferably provided on the face of the second substrate.

In this way, the structure and manufacturing processes of the optical tunable filter can be simplified as well as downsized since the gap for a space in which the movable part moves and the gap for interference of light are provided on the same substrate.

In the optical tunable filter, the first concave portion is preferably provided outside the second concave portion and formed continuously so as to couple with the second concave portion.

In this way, the light can be efficiently transmitted. Moreover, the movable part can be stably driven.

In the optical tunable filter, the drive member preferably moves the movable part with coulomb force.

In this way, the movable part can be stably driven.

In the optical tunable filter, a drive electrode is preferably provided on a face of the second substrate corresponding to the first gap.

In this way, the movable part can be more stably driven.

In the optical tunable filter, the first gap and the second gap are preferably formed by etching.

In this way, the first gap and the second gap can be precisely formed.

In the optical tunable filter, the first substrate is preferably made of silicon.

In this way, structure and manufacturing processes of the optical tunable filter can be simplified.

In the optical tunable filter, the movable part is preferably substantially circular in a plan view.

In this way, the movable part can be efficiently driven.

In the optical tunable filter, the second substrate is preferably made of a glass.

In this way, the substrate of high precision can be manufactured and the optical tunable filter can transmit the light efficiently.

In the optical tunable filter, the glass preferably contains an alkali metal.

In this way, manufacturing processes of the optical tunable filter can be more simplified and the first and second substrates can be solidly joined with high adhesion.

In the optical tunable filter, a first reflection film is preferably provided on a face of the movable part corresponding to the second gap and a second reflection film is preferably provided on the face of the second substrate opposed to the movable part In this way, the light can be efficiently reflected.

In the optical tunable filter, the first reflection film and the second reflection film are preferably made of a multilayer film.

In this way, the thickness of the film can be easily changed and the manufacturing process of the reflection film can be simplified.

In the optical tunable filter, the first reflection film is preferably an insulating film.

In this way, a reliable insulating structure can be easily formed between the movable part and the second substrate.

In the optical tunable filter, an antireflection film is preferably provided on at least a face of the movable part opposed to where the second gap is provided or a face of the second substrate opposed to where the second gap is provided.

In this way, the light reflection can be restrained and the light can be efficiently transmitted.

In the optical tunable filter, the antireflection film is preferably made of a multilayer film.

In this way, the thickness of the film can be easily changed and the manufacturing process of the antireflection film can be simplified.

In the optical tunable filter, a light incident part making light enter and/or exit to an opposite side relative to the second gap is preferably provided on the second substrate.

In this way, the light can be efficiently transmitted.

In a method of manufacturing an optical tunable filter of a first aspect of the present invention, the optical tunable filter includes a first substrate having light transmission properties and having a movable part and a supporting member that supports the movable part as the movable part is movable and having a smaller thickness than a thickness of the movable part, a second substrate having light transmission properties and opposed to the first substrate, a first gap and a second gap provided between the movable part and the second substrate, an interference part causing interference between the movable part and the second substrate through the second gap and a drive member changing an interval of the second gap by moving the movable part to the second substrate by making use of the first gap. The method of manufacturing an optical tunable filter of the first aspect of the present invention includes a step of forming the second substrate by forming a first concave portion and a second concave portion on a base material for the second substrate and a step of joining the second substrate and a base material for the first substrate. The method of manufacturing an optical tunable filter of the first aspect of the present invention also includes a step of etching the part of the base material for the first substrate including a part where the supporting member is formed other than an area where the movable part is formed and on an opposite side of a face opposed to the second substrate until the part reaches a thickness corresponding to the supporting member and a step of forming the first substrate by forming an opening having a predetermined pattern on the base material for the first substrate by etching.

In this way, the first substrate can be easily and securely manufactured.

In a method of manufacturing an optical tunable filter of a second aspect of the present invention, the optical tunable filter includes a first substrate having light transmission properties and having a movable part and a supporting member that supports the movable part as the movable part is movable and having a smaller thickness than a thickness of the movable part, a second substrate having light transmission properties and opposed to the first substrate, a first gap and a second gap provided between the movable part and the second substrate, an interference part causing interference between the movable part and the second substrate through the second gap and a drive member changing an interval of the second gap by moving the movable part to the second substrate by making use of the first gap. The method of manufacturing an optical tunable filter of the second aspect of the present invention includes a step of forming the second substrate by forming a first concave portion and a second concave portion on a base material for the second substrate, a step of forming a concave portion whose depth corresponds to the supporting member by etching a part of a base material for the first substrate including a part where the supporting member is formed other than an area where the movable part is formed until the part reaches a thickness corresponding to the supporting member, a step of joining the second substrate and a face of the base material for the first substrate where the concave portion is formed and a step of forming the first substrate by forming an opening having a predetermined pattern on base material for the first substrate the by etching.

In this way, the first substrate can be easily and securely manufactured.

In a method of manufacturing an optical tunable filter of a third aspect of the present invention, the optical tunable filter includes a first substrate having light transmission properties and having a movable part and a supporting member that supports the movable part as the movable part is movable and having a smaller thickness than a thickness of the movable part, a second substrate having light transmission properties and opposed to the first substrate, a first gap and a second gap provided between the movable part and the second substrate, an interference part causing interference between the movable part and the second substrate through the second gap and a drive member changing an interval of the second gap by moving the movable part to the second substrate by making use of the first gap. The method of manufacturing an optical tunable filter of the third aspect of the present invention includes a step of forming the second substrate by forming a first concave portion and a second concave portion on a base material for the second substrate, a step of forming a concave portion having a predetermined depth by etching a part of a base material for the first substrate including a part where the supporting member is formed other than an area where the movable part is formed, a step, of joining the second substrate and a face of the base material for the first substrate where the concave portion was formed and a step of forming the first substrate by etching a part of the base material for the first substrate including the part where the supporting member is formed other than an area where the movable part is formed and an opposite side of a face opposed to the second substrate until the part reaches a thickness corresponding to the supporting member and forming an opening having a predetermined pattern on the base material for the first substrate by etching.

In this way, the first substrate can be securely manufactured and the movable part can be more efficiently driven.

In the method of manufacturing an optical tunable filter, the base material for the first substrate is preferably an active layer of a multilayer substrate that is composed of the active layer having conducting properties, an insulating layer and a base layer in this order, and the first substrate is preferably formed from the active layer by joining the multilayer substrate and the second substrate from a side of the active layer and sequentially removing the base layer and the insulating layer.

In this way, the base material for the first substrate and the second substrate can be easily joined. Moreover, the insulating layer can serve as an etching stopper when the base layer is removed so that a thickness of the active layer which is going to be the first substrate can be precisely controlled.

In the method of manufacturing an optical tunable filter, the multilayer substrate is preferably a silicon on insulator (SOI) substrate that consists of the active layer mainly made of Si, the insulating layer mainly made of $SiO_2$ and provided on the active layer and the base layer mainly made of Si and provided on the insulating layer, or a SOI substrate that consists of the active layer mainly made of Si, the insulating layer mainly made of $SiO_2$ and provided on the active layer and the base layer mainly made of sapphire and provided on the insulating layer.

In this way, the first substrate with a mirrored surface can be easily obtained and a manufacturing process of the first substrate can be simplified.

BRIEF DESCRIPTION OF THE DRAWINGS

FIG. 1 is a sectional view of an optical tunable filter according to a first embodiment of the present invention.

DETAILED DESCRIPTION

Embodiments of the present invention will now be described in detail with reference to the accompanying drawings.

Figure 2:
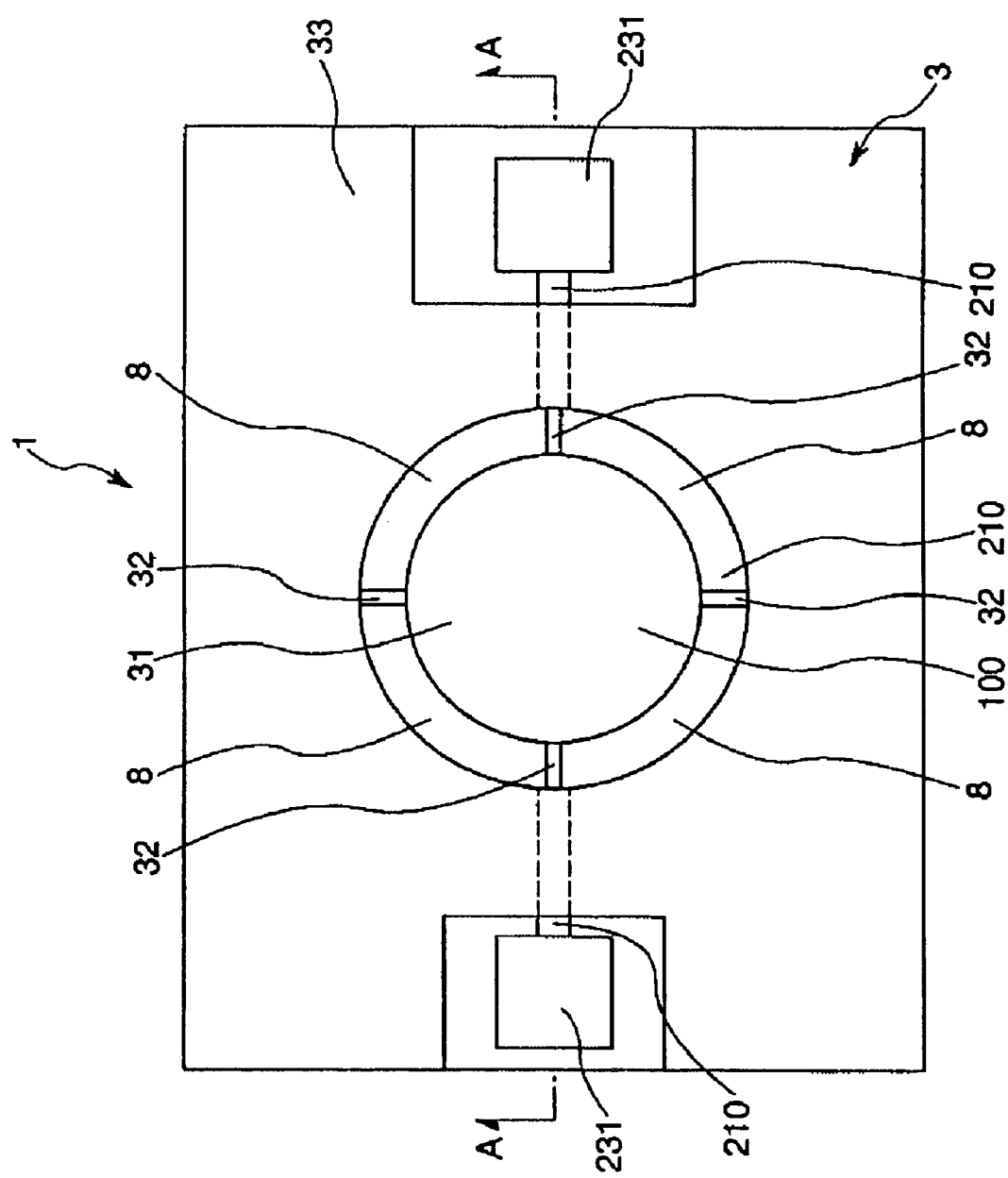
FIG. 2 is a plan view of the optical tunable filter according to the first embodiment of the present invention.
Figure 3:
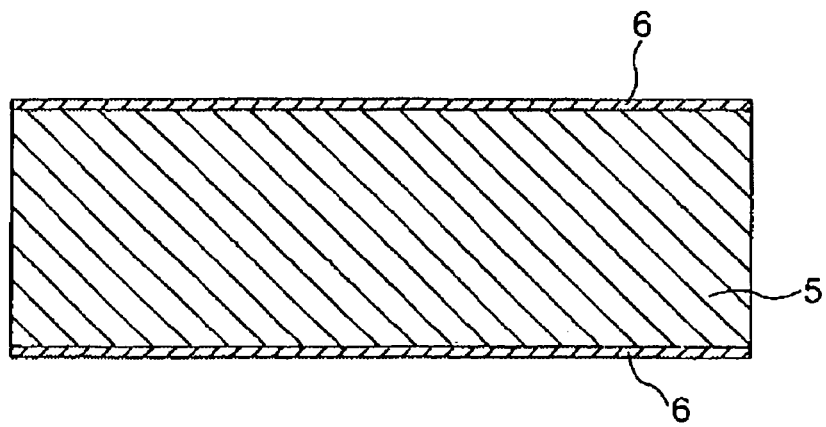
FIGS. 3a through 3d show steps for manufacturing the optical tunable filter according to the first embodiment of the present invention.
Figure 3:
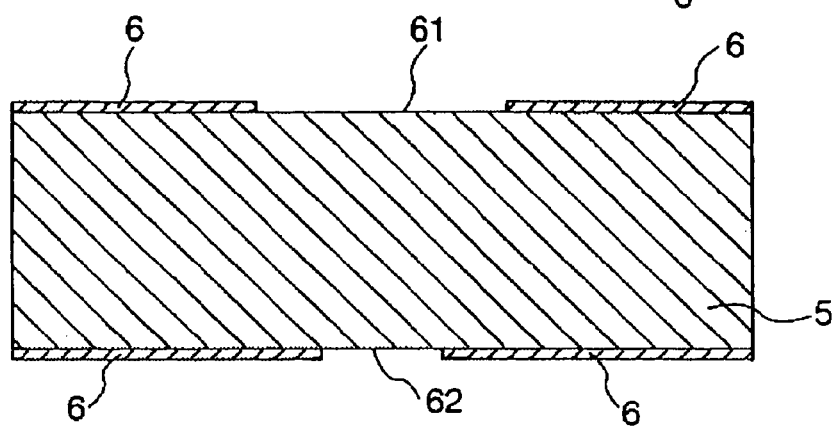
Figure 3:
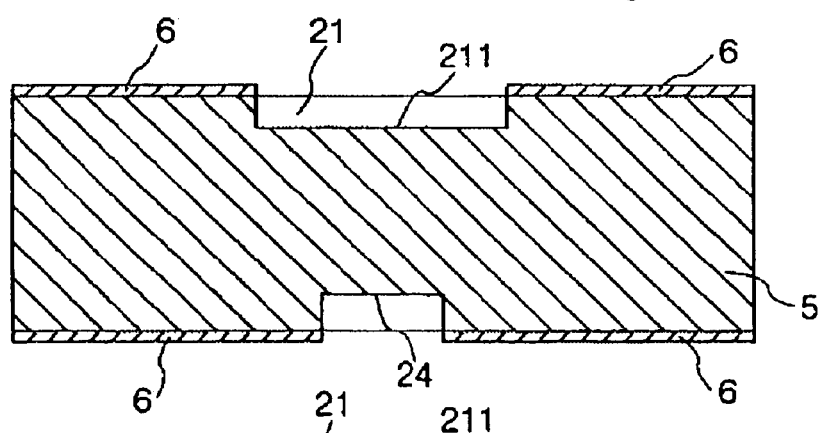
Figure 3:
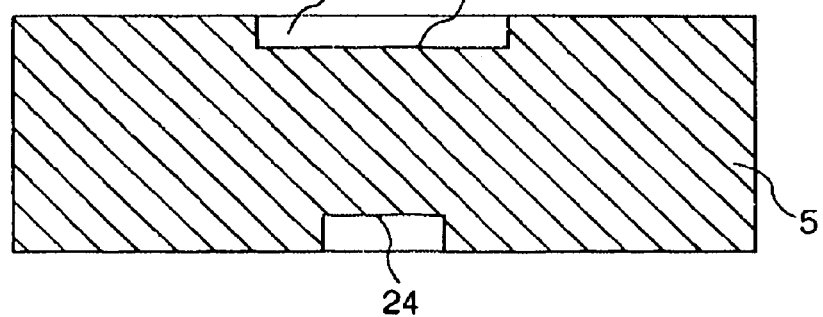
Figure 4:
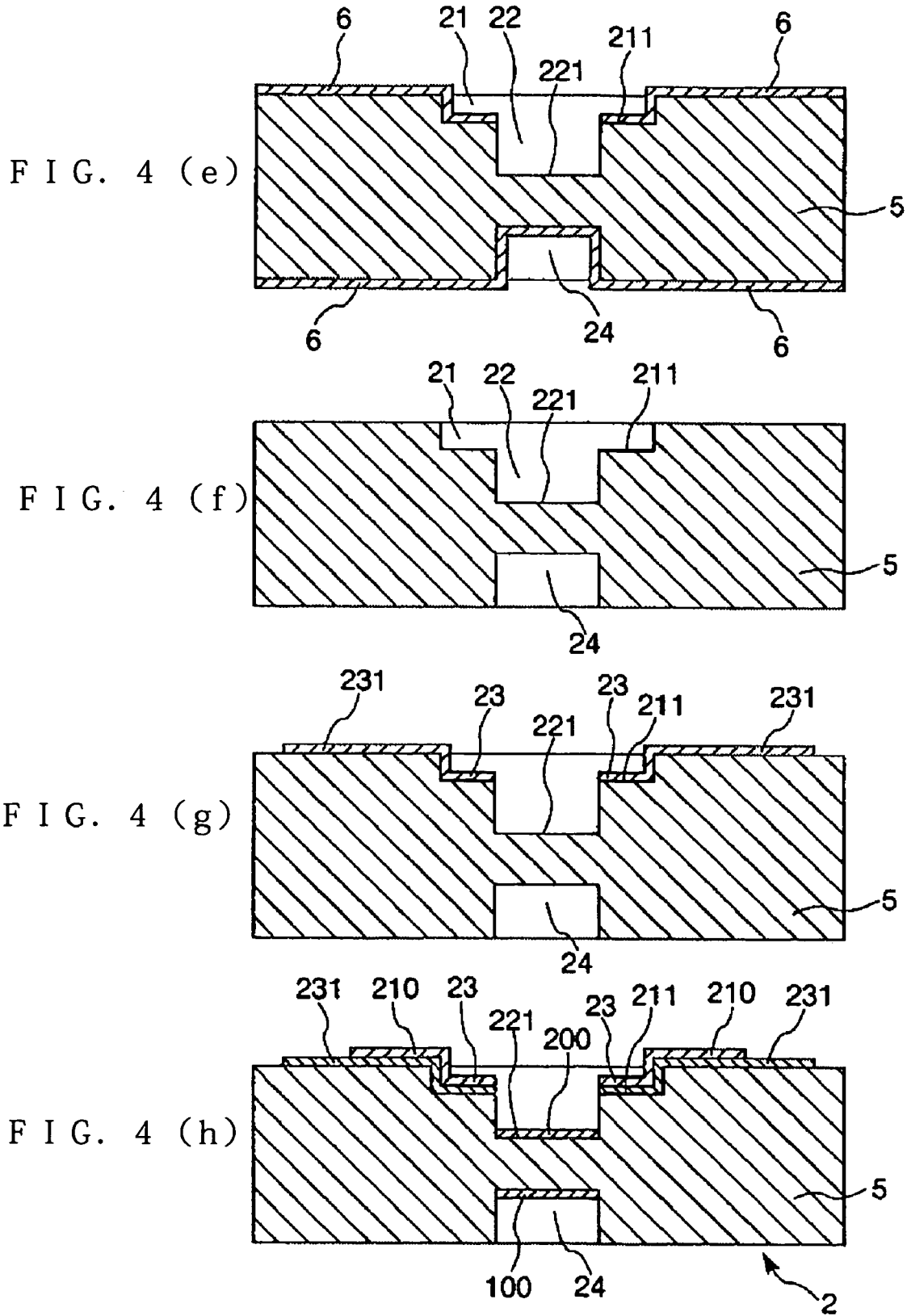
FIGS. 4e through 4h show steps for manufacturing the optical tunable filter according to the first embodiment of the present invention.
Figure 5:
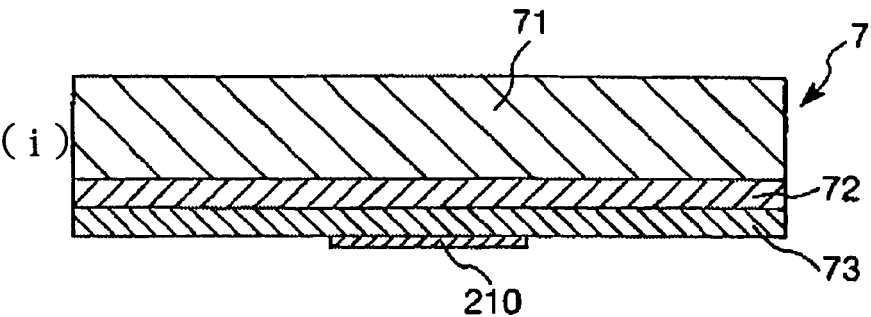
FIGS. 5i through 5l show steps for manufacturing the optical tunable filter according to the first embodiment of the present invention.
Figure 5:
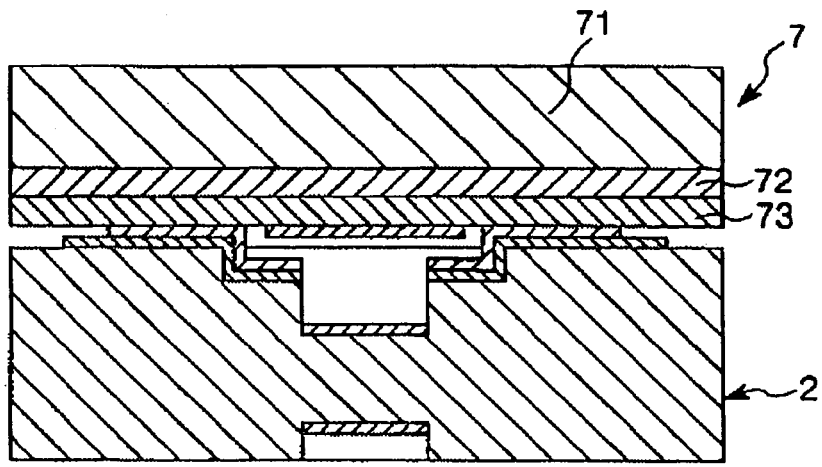
Figure 5:
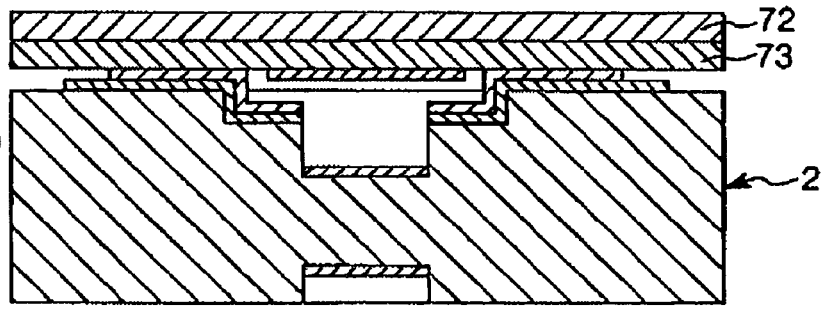
Figure 5:
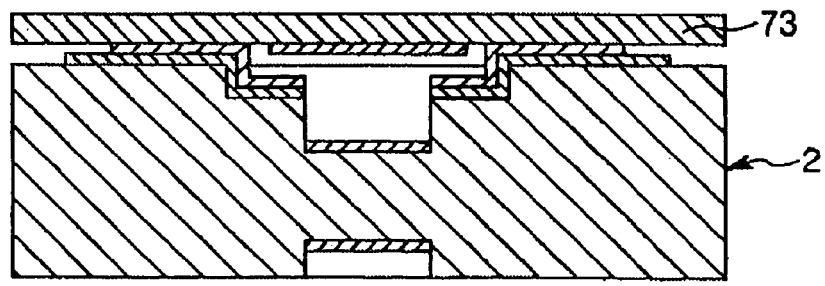
Figure 6:
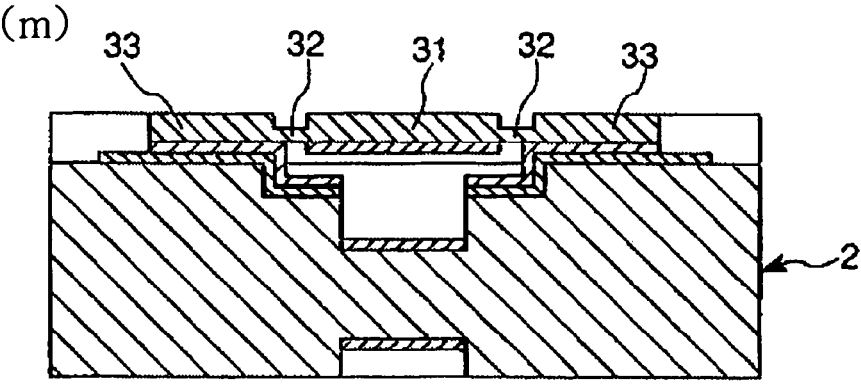
FIGS. 6m and 6n show steps for manufacturing the optical tunable filter according to the first embodiment of the present invention.
Figure 6:
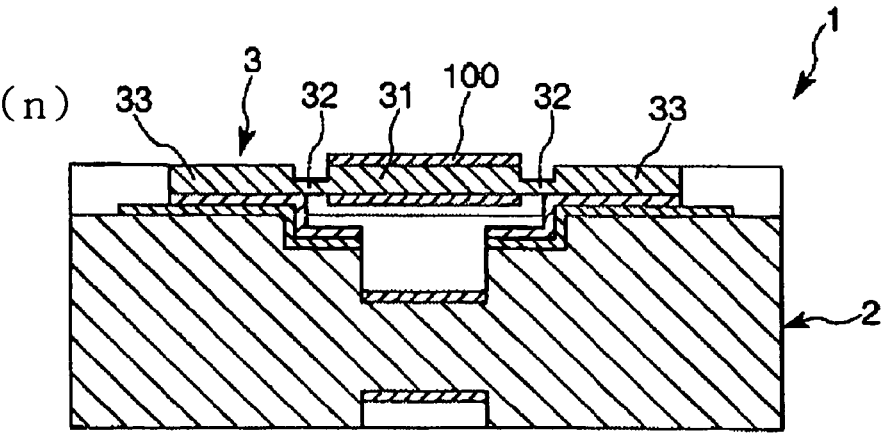

FIG. 1 is a sectional view of an optical tunable filter of a first embodiment along the line A-A of FIG. 2. FIG. 2 is a plan view of the optical tunable filter shown in FIG. 1. In the following description, the upper side of FIG. 1 is called "upward" and the lower side of FIG. 1 is called "downward".

As shown in FIG. 1, an optical tunable filter 1 includes a first substrate 3 that is made of silicon, a base substrate 2 that is opposed to the first substrate 3, a first gap 21 and a second gap 22 that are provided between the first substrate 3 and the base substrate 2.

The first substrate 3 has conducting and light transmission properties. The first substrate 3 has a movable part 31 that is positioned in the middle, a supporting member 32 that supports the movable part 31 in a displaceable (movable) state and a conducting part 33 that turns on electricity to the movable part 31.

The movable part 31, the supporting member 32 and the conducting part 33 are formed so as to be integrated. The conducting part 33 is coupled to the movable part 31 through the supporting member 32.

The first substrate 3 and the base substrate 2 are joined at the conducting part 33.

The base substrate 2 includes a main body 20 (a second substrate) that has a first concave portion 211 and a second concave portion 221. The base substrate 2 also includes a drive electrode 23, a conducting layer 231, a light incident part 24 (light transmission part), an antireflection film 100 and a second reflection film 210.

The base substrate 2 has light transmission properties. As a material for the base substrate 2, for example, a soda glass, a crystalline glass, a quartz glass, a lead glass, a potassium glass, a borosilicate glass, a sodium borate glass, a non alkali glass and other glasses, and silicon and the like can be named. However, a glass that includes alkali metal such as sodium (Na) is desirable.

From this aspect, the soda glass, the potassium glass, the sodium borate glass and the like can be used. For example, Corning Pyrex glass (registered trademark) and the like are preferably used.

A (average) thickness of the main body 20 depends on material, application and others and is not particularly limited. However, it is preferably set to be about 10-2000 μm, and more particularly, about 100-1000 μm.

The first concave portion 211 and the second concave portion 221 which is deeper than the first concave portion 211 are provided on a face of the main body 20 that is opposed to the movable part 31.

The first concave portion 211 is provided outside the second concave portion 221 and formed continuously so as to couple to the second concave portion 221.

An outer shape of the first concave portion 211 corresponds to that of the movable part 31, which is described later, and a size (outside dimension) of the first concave portion 211 is slightly larger than that of the movable part 31.

An outer shape of the second concave portion 221 corresponds to that of the movable part 31 and a size of the second concave portion 211 is slightly smaller than that of the movable part 31.

In this way, the first concave portion 211 is opposed to a peripheral part of the movable part 31.

The first concave portion 211 and the second concave portion 221 are preferably formed by etching a surface of the main body 20 which is described later.

A space within the first concave portion 211 will become the first gap 21. In other words, the movable part 31 and the first concave portion 211 together define the first gap 21.

In the same manner, a space within the second concave portion 221 will become the second gap 22. In other words, the movable part 31 and the second concave portion 221 together define the second gap 22.

A (average) thickness of the first gap 21 depends on application and others and is not particularly limited. However, it is preferably set to be about 0.5-20 µm.

A (average) thickness of the second gap 22 depends on application and others and is not particularly limited. However, it is preferably set to be about 1-100 µm.

In this embodiment, the movable part 31 is substantially circular form in a plan view. With this shape, the movable part 31 can be efficiently driven. The movable part 31 can also move freely in the upward and the downward direction in FIG. 1.

A (average) thickness of the movable part 31 depends on material, application and others and is not particularly limited. However, it is preferably set to be about 1-500 µm, and more particularly, about 10-100 µm.

A first reflection film 200 (HR coat) reflecting a light effectively is provided on a surface of the movable part 31 which is opposed to the second concave portion 221 (undersurface of the movable part 31). The antireflection film 100 (AR coat) that restrains the light reflection is provided on an opposite surface of the surface of the movable part 31 (upper face of the movable part 31).

The shape of the movable part 31 is not limited to the one shown in the figures.

At near the center of FIG. 2, four supporting members 32 that have elasticity (flexibility) are formed so as to be integrated with the movable part 31 and the conducting part 33.

Each supporting member 32 is divided by an opening 8 at even angles (90 degrees each) on a peripheral side face of the movable part 31.

In this embodiment, each supporting member 32 is formed so as to have a thickness that is smaller than that of the movable part 31.

In this way, the movable part 31 can move as much as a case where the supporting member 32 has the same thickness as that of the movable part 31, even when a spring constant which depends on an elasticity of the supporting member 32 is made small and the coulomb force is smaller than that of the conventional filter.

Consequently, a voltage that is applied in order to generate the coulomb force can be lowered and the power consumption can be reduced. The coulomb force is described in detail later.

The supporting member is required to sufficiently support a weight of the movable part 31 when the coulomb force does not act. A lower limit of the thickness of the supporting member varies depending on conditions such as the weight and the size of the movable part 31, the number of the supporting members 32 and a thickness of the first substrate 3.

In order to sufficiently support the weight of the movable part 31 when the thickness of the supporting member 32 is smaller than that of the movable part 31 and the coulomb force does not act, the thickness of the supporting member 32 is decided by, for example, the size of the movable part 31, the number of the supporting members 32 and the thickness of the first substrate 3.

When the thickness of the supporting member 32 is A and the thickness of the movable part is B, it is preferred that A/B is 0.1-0.9, and more particularly, 0.3-0.7.

In this embodiment, each lower side (the base substrate 2 side) of the movable part 31 and the conducting part 33 is coupled to the supporting member 32.

The number of the supporting members 32 is not necessarily limited to four but, for example, it may be two, three or more than five. The shape of the supporting members 32 is not limited to the one shown in the figures.

The light incident part 24 is provided on an undersurface of the main body 20. Light enters the optical tunable filter 1 through the light incident part 24. The antireflection film 100 is provided on a surface of the light incident part 24.

The second reflection film 210 is provided on a surface of the second concave portion 221. The drive electrode 23 is provided on an upper surface of the first concave portion 211. The conducting layer 231 which is in the form of laminae (films) is provided on an area from the drive electrode 23 to an edge of the main body 20.

The second reflection film 210 is also provided on an upper surface of the drive electrode 23 and the conducting layer 231.

The drive electrode 23 and the conducting layer 231 have conducting properties and may be made of, for example, metal such as Cr, Al, an aluminum alloy, Ni, Zn, Ti and Au, a resin in which carbon, titanium and the like are dispersed, silicon such as polysilicon and amorphous silicon, silicon nitride and transparent conductive material such as indium tin oxide (ITO).

A (average) thickness of the drive electrode 23 and the conducting layer 231 depends on material, application and others and is not particularly limited. However, it is preferably about 0.1-5 µm.

Figure 12:
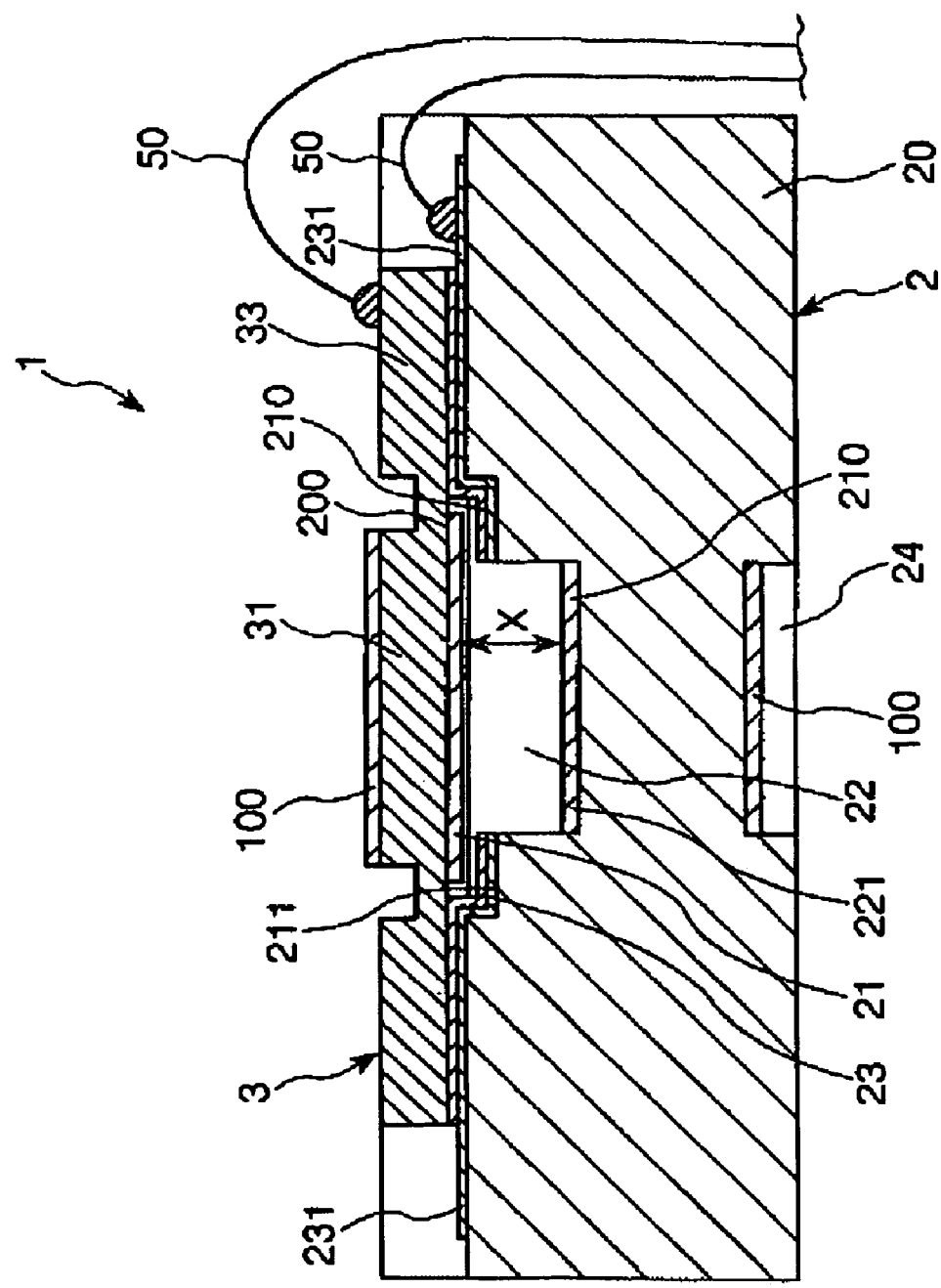
FIG. 12 shows the optical tunable filter to which a wire is coupled according to the present invention.

As shown in FIG. 12, a wire 50 is coupled to the conducting part 33 of the optical tunable filter 1 and an unshown circuit board by brazing filler metal such as a solder. The wire 50 is also coupled to the conducting layer 231 and the unshown circuit board.

In this way, the conducting part 33 and the conducting layer 231 are electrically coupled to an unshown power source through the wire 50 and the circuit board. As such, a voltage can be applied between the movable part 31 and the drive electrode 23.

When the voltage is applied between the movable part 31 and the drive electrode 23, an electric potential difference is produced between the movable part 31 and the drive electrode 23 and the coulomb force is generated between them. The movable part 31 moves downward and comes to rest by the coulomb force.

In this case, the movable part 31 can be moved to a specific position in a vertical direction to the base substrate 2 by, for example, changing the voltage continuously or in incremental steps.

In this way, a distance X between the second gap 22 and the movable part 31 can be adjusted (changed) to a specific distance and which enables a light having a specific wavelength to be emitted as described later.

A main part of a drive member (actuator) driven by the coulomb force consists of the drive electrode 23, the first gap 21 and the peripheral part of the movable part 31. In this embodiment, the first reflection film 200 and the second reflection film 210 have insulating properties.

In other words, the first reflection film 200 and the second reflection film 210 can serve as an insulating film. In this way, the first reflection film 200 can prevent the drive electrode 23 and the movable part 31 from being short-circuited.

The second reflection film 210 can prevent the conducting layer 231 and the first substrate 3 from being short-circuited.

In this embodiment, each of the antireflection film 100, the first reflection film 200 and the second reflection film 210 is made of a multilayer film. A multilayer film that can transmit or reflect a light having a specific wavelength can be formed (or characteristic can be changed) by setting (adjusting) a thickness of each layer in the multilayer film, the number of the layers that consist the multilayer film and material of the layers.

In this way, the antireflection film 100, the first reflection film 200 and the second reflection film 210 are easily made.

Next, an operation (action) of the optical tunable filter of the present invention is described with reference to FIG. 11.

Figure 11:
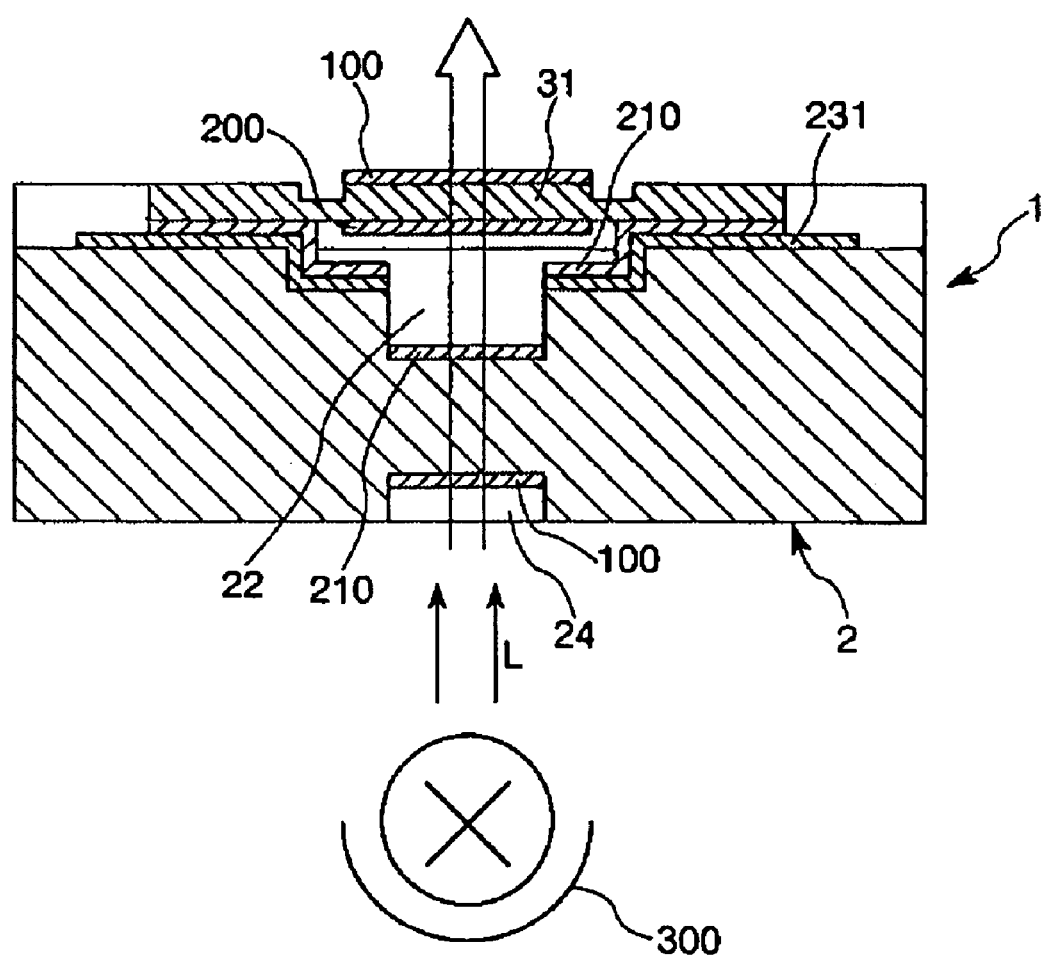
FIG. 11 shows an example of an operation of the optical tunable filter according to the present invention

As shown FIG. 11, a light L emitted from a light source 300 enters from the light incident part 24 that is provided on the undersurface of the base substrate 2. In other words, the light L penetrates the antireflection film 100, the base substrate 2 and the second reflection film 210 and enters the second gap 22.

After the light enters, it is repeatedly reflected (due to interference) between the first reflection film 200 and the second reflection film 210. At this time, a loss of the light L is held down by the first reflection film 200 and the second reflection film 210.

As a result of the interference of the light L, a specific wavelength light (interference light) corresponding to the distance X penetrates the first reflection film 200, the movable part 31 and the antireflection film 100, and then exits from the upper face of the movable part 31.

This optical tunable filter 1 can be used for all kinds of purposes. For example, it can be used for a device that determines intensity of a light corresponding to a specific frequency and it can measure up the intensity easily.

In this embodiment, though the light enters from the light incident part 24, this is not particularly limited. For example, the light may enter from the upper face of the movable part 31. In that case, the light may exit from the light incident part 24 or the upper face of the movable part 31.

Moreover, in this embodiment, though the light entered from the light incident part 24 exits from the upper face of the movable part 31, this is not particularly limited. For example, the light entering from the light incident part 24 may exit from the light incident part 24.

Furthermore, though the antireflection film 100, the first reflection film 200 and the second reflection film 210 are made of the multilayer film in this embodiment, they are not limited. For example, the antireflection film and the reflection film may be made of a single layer.

Moreover, though the second reflection film is provided on the conducting layer 231 and made to be the insulating layer in this embodiment, it is not limited to this. For example, other members having insulating properties may be used.

Furthermore, though the drive member utilizes the coulomb force in this embodiment, the present invention is not limited to this configuration of the drive member.

Manufacturing Method

Next, a method of manufacturing the optical tunable filter 1 of the first embodiment is described by way of an example of manufacturing an optical tunable filter shown in process drawings of FIG. 3 through 6. In the following description, the upper side of FIG. 3 through 6 is called "upward" and the lower side of FIG. 3 through 6 is called "downward". A feature of the manufacturing method according to the first embodiment of the present invention is that the supporting member is made thin by processing from an upper side of the supporting member (a counter face of a second Si layer 73 to a face opposed to the main body 20, this will be described later). The manufacturing method includes (1) a step of forming the base substrate 20, (2) a step of processing a wafer 7, (3) a step of joining the base substrate 20 and the wafer 7 and (4) a step of forming the first substrate 3. These steps are sequentially described below.

1) Step of Forming the Base Substrate 20

<1> First, before starting to manufacture the optical tunable filter 1, a transparent substrate 5 (a base material for the second substrate) that has light transmission properties is provided. A substrate that has uniform thickness and no deflection and dents is preferably used as the transparent substrate 5. The same materials named in the above description of the base substrate 20 can be used as the material for the transparent substrate 5. In particular, a material having a thermal expansion coefficient approximately the same as that of the second Si layer 73 is desirable since the transparent substrate 5 is heated at the time of anodic bonding. The second Si layer 73 is described later in more detail.

<2> Next, a mask layer 6 is formed (masked) on an upper face and a lower face of the transparent substrate 5 as shown in FIG. 3a.

As a material for the mask layer 6, for example, metals such as Au/Cu, Au/Ti, Pt/Cr and Pt/Ti, silicon such as polysilicon and amorphous silicon and silicon nitride can be named. When silicon is used for the mask layer 6, adhesiveness between the mask layer 6 and the transparent substrate 5 can be improved. When metal is used for the mask layer 6, visibility of the mask layer 6 can be improved.

The thickness of the mask layer 6 is not particularly limited. However, it is preferably set to be about 0.01-1 µm, and more particularly, about 0.09-0.11 µm. When the mask layer 6 is too thin, it can not protect the transparent substrate 5 adequately. When the mask layer 6 is too thick, the mask can easily come unstuck by internal stress of the mask layer 6.

The mask layer 6 may be made by, for example, chemical vapor deposition (CVD), sputtering, vapor deposition such as an evaporation and plating.

<3> Next, as shown in FIG. 3b, an opening 61 and an opening 62 are formed on the mask layer 6.

The opening 61 is, for example, provided where the first concave portion 211 is going to be formed. The shape (planer shape) of the opening 61 corresponds to the shape (planer shape) of the first concave portion 211.

The opening 62 is, for example, provided on a face opposite to where the first concave portion 211 is going to be formed. The shape (planer shape) of the opening 62 corresponds to the shape (planer shape) of the second concave portion 221 that is going to be formed later.

These openings 61 and 62 can be made by, for example, photolithography. To be more specific, a resist layer (not shown in the figures) having a pattern that corresponds to the openings 61 and 62 is made on the mask layer 6. Then, a part of the mask layer 6 is removed by using the resist layer as a mask. Then, the resist layer is removed. In this way, the openings 61 and 62 are made. The part of the mask layer 6 may be removed by, for example, dry etching using gases such as fluorocarbon (CF) gas and chlorine-based gas and wet etching using etchant such as hydrofluoric acid-nitric acid solution and alkaline solution.

<4> Next, as shown in FIG. 3c, the first concave portion 211 and the light incident part 24 are formed on the transparent substrate 5.

To form the first concave portion 211, for example, etching such as dry etching and wet etching can be used. The transparent substrate 5 is isotropically etched due to the openings 61 and 62, and the first concave portion 211 and the light incident part 24 that are column-shaped are formed.

By wet etching, the first concave portion 211 and the light incident part 24 having shapes that are close to an ideal column can be formed. As an etchant for wet etching, for example, fluorinated acid-based etchant is preferably used. In this case, if alcohol (especially multiple alcohol) such as glycerin is added to the etchant, a surface of the first concave portion 211 gets very smooth.

<5> Next, the mask layer 6 is removed.

The mask layer 6 can be removed by, for example, wet etching using etchant such as alkaline solution (for example, tetramethylammonium hydroxide solution and the like), etching solution (removal solution) such as hydrochloric acid-nitric acid solution and the hydrofluoric acid-nitric acid solution. The mask layer 6 can also be removed by, for example, dry etching using CF gas, chlorine-based gas and the like.

When the mask layer 6 is removed by immersing the transparent substrate 5 in the removal water, the mask layer 6 can be removed easily and effectively.

As described above, the first concave portion 211 and the light incident part 24 are formed on a predetermined position of the transparent substrate 5 as shown in FIG. 3d.

The second concave portion 221 can be formed and provided in the same way as the first concave portion 211.

When the second concave portion 221 is formed, it is preferred to change at least one forming condition from that of the first concave portion 211 as shown in FIG. 4e. The forming conditions are the opening (the mask layer 6) area and the etching conditions at the process <4> (for example, etching time, etching temperature, composition of the etchant and the like). When a part of the forming condition of the second concave portion 221 is different from that of the first concave portion 211, a radius of the second concave portion 221 can be easily differed from that of the first concave portion 211.

In this way, t he first concave portion 211, the second concave portion 221 and the light incident part 24 are formed on predetermined positions on the transparent substrate 5 as shown in FIG. 4f.

The following processes are carried out to form the drive electrode 23 and the conducting layer 231 on the surface of the transparent substrate 5.

<6> First, a mask layer (not shown in figures) is formed on the upper surface of the transparent substrate 5 and the first concave portion 211.

<7> Then, the drive electrode 23 and the conducting layer 231 are formed as shown in FIG. 4g.

As a material for the drive electrode 23 and the conducting layer 231, for example, metal such as Cr, Al, an aluminum alloy, Ni, Zn, Ti and Au, a resin in which carbon, titanium and the like are dispersed, silicon such as polysilicon and amorphous silicon, silicon nitride and transparent conductive material such as ITO can be named.

The thickness of the drive electrode 23 and the conducting layer 231 is, for example, preferably about 0.1-0.2 μm.

The drive electrode 23 is provided on the first concave portion 211 and the conducting layer 231 is provided on the upper surface of the transparent substrate 5. The shape (planer shape) of the drive electrode 23 preferably corresponds to the shape (planer shape) of the first concave portion 211.

The drive electrode 23 and the conducting layer 231 can be made by, for example, photolithography. To be more specific, a resist layer (not shown in the figures) having a pattern that corresponds to the drive electrode 23 and the conducting layer 231 is made on the mask layer 6. Then, a part of the mask layer 6 is removed by using the resist layer as a mask. Then, the resist layer is removed. In this way, the drive electrode 23 and the conducting layer 231 are made. The part of the mask layer 6 may be removed by, for example, dry etching using gases such as CF gas and chlorine-based gas and wet etching using etchant such as hydrofluoric acid-nitric acid solution and the alkaline solution.

<8> Next, as shown in FIG. 4h, the second reflection film 210 is provided on the surface of the first concave portion 211, a surface of the drive electrode 23 and at a predetermined place on a surface of the conducting layer 231. The antireflection film 100 is provided on the surface of the light incident part 24.

In this process, the antireflection film 100, the first reflection film 200 and the second reflection film 210 are made of the multilayer film. As a material for the multilayer film, for example, $SiO_2$, $Ta_2O_5$, SiN and the like can be named.

The multilayer film having a predetermined thickness can be formed by placing one layer upon another.

A total thickness of the first reflection film 200 and the second reflection film 210 is, for example, preferably about 0.1-12 μm.

In this way, the base substrate 2 for the optical tunable filter, which is the transparent substrate 5 on which the first concave portion 211, the second concave portion 221, the drive electrode 23, the light incident part 24, the first reflection film 200 and the antireflection film 100 are formed in predetermined positions, is obtained.

(2) Step of Processing the Wafer 7

When the first substrate 3 is manufactured, firstly, the wafer 7 is provided. The wafer 7 can be made and provided, for example, in the way described below.

A surface of the wafer 7 is preferably formed so as to be able to serve as a mirrored surface. As such, as the wafer 7, for example, a silicon on insulator (SOI) substrate, silicon on sapphire (SOS), a silicon substrate and the like can be used.

In a forming process of this embodiment, the SOI substrate is employed as the wafer 7. The wafer 7 consists of three layers; a first Si layer 71 (base layer), a $SiO_2$ layer 72 (insulating layer) and a second Si layer 73 (active layer). The first Si layer 71 (base layer) and the $SiO_2$ layer 72 are going to be removed. The second Si layer 73 is going to be processed to be the first substrate 3.

The thickness of the wafer 7 is not particularly limited. However, it is preferred that the thickness of the second Si layer 73 is about 10-100 μm.

<9> In a joining process of the base substrate 20 and the wafer 7, which will be described later, the first reflection film 200 is formed on an undersurface of the second Si layer 73 so as to oppose the second concave portion 221 as shown in FIG. 5i.

(3) Step of Joining the Base Substrate 20 and the Wafer 7

<10> Next, the base substrate 20 and the wafer 7 are joined such that the second Si layer 73 and a face on which the second concave portion 221 is formed are opposed to each other. The base substrate 20 and the wafer 7 can be joined by, for example, anodic bonding.

The anodic bonding, for example, is performed in the following way. First, the base substrate 2 is coupled to a negative terminal of an unshown direct-current power source and the second Si layer 73 is coupled to a positive terminal of the unshown direct-current power source. Then, a voltage is applied as the base substrate 2 is heated. The heating helps $Na^+$ move in the base substrate 2. A joint surface of the base substrate 2 is charged negatively by the movement of $Na^+$ and a joint surface of the wafer 7 is charged positively. Consequently, the base substrate 2 and the wafer 7 are solidly joined.

In this embodiment, though the anodic bonding is applied to perform the joining, the joining method is not limited to this. For example, a hot pressing joint, adhesive and low-melting glass can be used to join them.

(4) Step of Forming the First Substrate 3

<11> Next, the first Si layer 71 is removed by etching or polishing as shown in FIG. 5k. Both wet etching and dry etching can be used. However, dry etching is preferred. When the first Si layer 71 is removed, the $SiO_2$ layer 72 serves as a stopper in both wet etching and dry etching. Dry etching does not use an etching solution so that it can prevent the second Si layer 73 opposed to the drive electrode 23 from being damaged. Thereby, a high yield ratio of the optical tunable filter 1 can be expected.

<12> Next, the $SiO_2$ layer 72 is removed by etching as shown in FIG. 5l. When etching is performed, an etchant including fluorinated acid is preferably used. In this way, the $SiO_2$ layer is adequately removed and the second Si layer 73 can be adequately formed.

When the wafer 7 is made of mono silicon and has an appropriate thickness to go through the next process and the surface is a mirrored surface, the steps <11> and <12> can be omitted. In this way, the manufacturing process of the optical tunable filter 1 can be simplified.

<13> Next, a resist layer (not shown in the figures) having a pattern corresponding to the shape (planer shape) of the movable part 31 and the supporting member 32 is formed.

Then, a photoresist pattern (not shown in the figures) is formed on the second Si layer 73 such that a part that is going to be the first substrate 3 is left remaining by the above-described photolithography process. In this embodiment, in order to make the supporting member 32 thin, a two-tiered anisotropic dry etching process is performed using a half etching technique. In the first step, an area that is going to be the opening 8 and the supporting member 32 is etched until it reaches an intended thickness (in other words, the thickness of the supporting members 32) without forming photoresist on the area. Then, in the second step, a photoresist is formed on an area that is going to be the supporting member 32 and the other area is etched. In the first and second steps, the areas where the photoresist is not formed are etched and the opening 8 is formed as shown in FIG. 2. The supporting member 32 is also formed as shown in FIG. 6m.

In this process, as the anisotropic etching, for example, inductively coupled plasma (IPC) etching is performed. In other words, etching by an etching gas and formation of a protection film by a deposition gas are alternatively and repeatedly performed to form the first substrate 3.

As the etching gas, for example, $SF_6$ can be used. As the deposition gas, for example, $C_4F_8$ can be used.

As described above, only the second Si layer 73 is etched. In addition, the movable part 31, the supporting member 32 and the conducting part 33 can be accurately and securely formed without affecting other parts since the present embodiment employs dry etching.

In this way, the first substrate 3, and especially, the movable part 31, can be easily, accurately and securely formed since dry etching, and particularly IPC etching, is used.

After etching, the photoresist pattern is removed by, for example, using oxygen plasma. Then, the first substrate 3 is obtained.

In this process of the present invention, dry etching other than the above-mentioned one may be employed to form the first substrate 3. Methods other than dry etching may also be employed to form the first substrate 3.

<14> Next, the antireflection film 100 is formed on the upper surface of the movable part 31 in the above-described way as shown in FIG. 6n. Then, the optical tunable filter 1 shown in FIG. 1 is obtained.

In this embodiment, though the conducting layer is formed by patterning, the way of forming the conducting layer is not limited to this. For example, a groove may be formed on the transparent substrate and the conducting layer may be formed in the groove.

As described above, according to the optical tunable filter 1 of the first embodiment of the present invention, the structure of the optical tunable filter 1 can be simplified because the first gap 21 (gap for moving the movable part 31) and the second gap 22 (gap for reflecting or letting the light of the optical tunable filter 1 through) are formed on the base substrate 2 (the same substrate). Particularly, a manufacturing process of forming the first gap 21 can be simplified and the filter 1 downsized.

A second embodiment of the optical tunable filter 1 will be described below focusing on differences from the first embodiment. The same elements are given the same numerals and those explanations will be omitted.

The optical tunable filter 1 of the second embodiment is the same as that of the first embodiment except for the connecting locations between the supporting member and the movable part and the conducting part.

Figure 7:
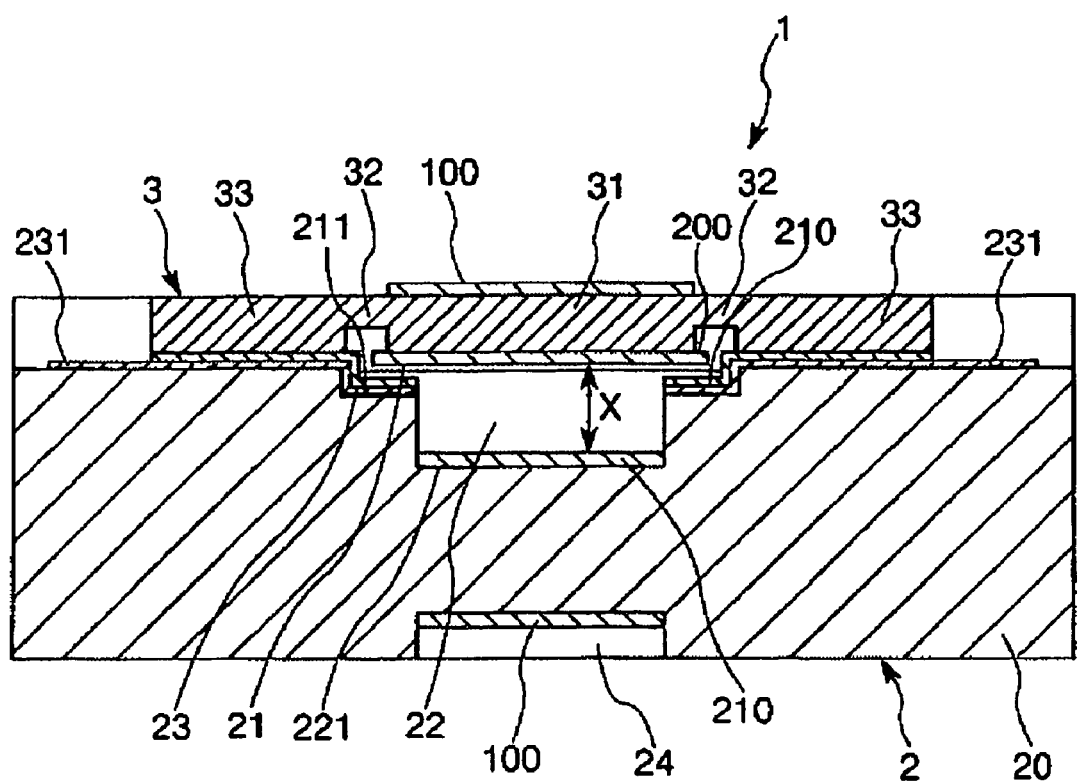
FIG. 7 is a sectional view of the optical tunable filter according to a second embodiment of the present invention.

As shown in FIG. 7, in the optical tunable filter 1 of the second embodiment, an upper side (opposite side to the base substrate 2 side) of the movable part 31 and the conducting part 33 are coupled to the supporting member 32.

A manufacturing method is described below.

Manufacturing Method

Figure 8:
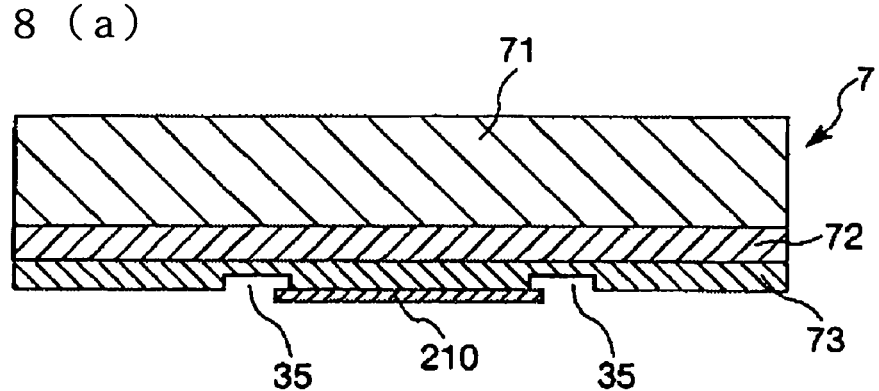
FIGS. 8a and 8b show steps for manufacturing the optical tunable filter according to the second embodiment of the present invention.
Figure 8:
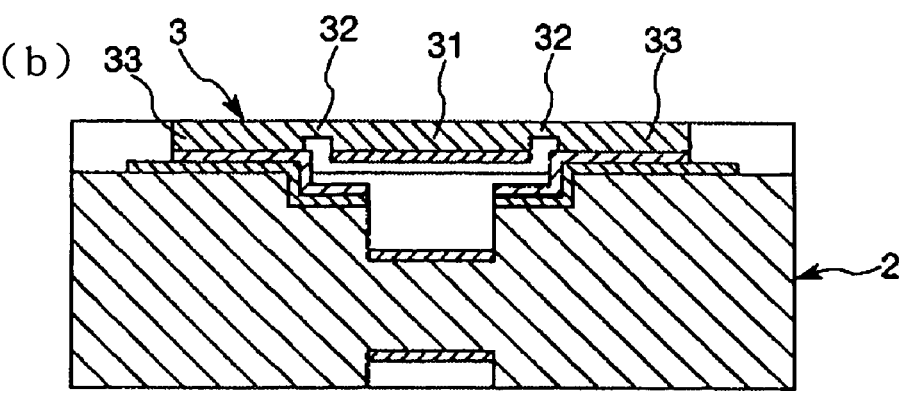

FIGS. 8a and 8b are figures for explaining the manufacturing method of the second embodiment (schematically showing manufacturing processes). A feature of the manufacturing method according to the second embodiment is that the supporting member is made thin by processing from a lower side of the supporting member (a counter face side relative to the second base substrate 2 of the second Si layer 73). The manufacturing processes are the same as those of the first embodiment except process <9>' is added after process <9> in step (2) and process <13> in step (4) is different. Process <9>' in step (2) and process <13> in step (4) are now described.

<9>' A photoresist pattern (not shown in the figures) is formed on the undersurface of the second Si layer 73 by photolithography and two-tiered anisotropic dry etching is performed in the same way as process <13> of the first embodiment. The shape (planer shape) of the photoresist pattern corresponds to the shape (planer shape) of the supporting member 32. The thickness (depth) of the etching corresponds to the thickness of the supporting member 32. In other words, a bottom of a concave portion 35 is located corresponding to the thickness of the supporting member 32. After etching, the photoresist pattern is removed by, for example, using oxygen plasma. Then, the concave portion 35 shown in FIG. 8a is obtained.

<13> In the manufacturing process of the second embodiment, a photoresist pattern (not shown in the figures) is formed on the upper surface of the second Si layer 73 such that the part that is going to be the first substrate 3 is left remaining. Then, the supporting member 32 is formed by a single etching as shown in FIG. 8b.

The second embodiment has the same effects as those of the first embodiments.

A third embodiment of the optical tunable filter 1 will be described below focusing on differences from that of the first embodiment. The same elements are given the same numerals and those explanations will be omitted.

The optical tunable filter 1 of the third embodiment is the same as that of the first embodiment except for the connecting locations between the supporting member and the movable part and the conducting part.

Figure 9:
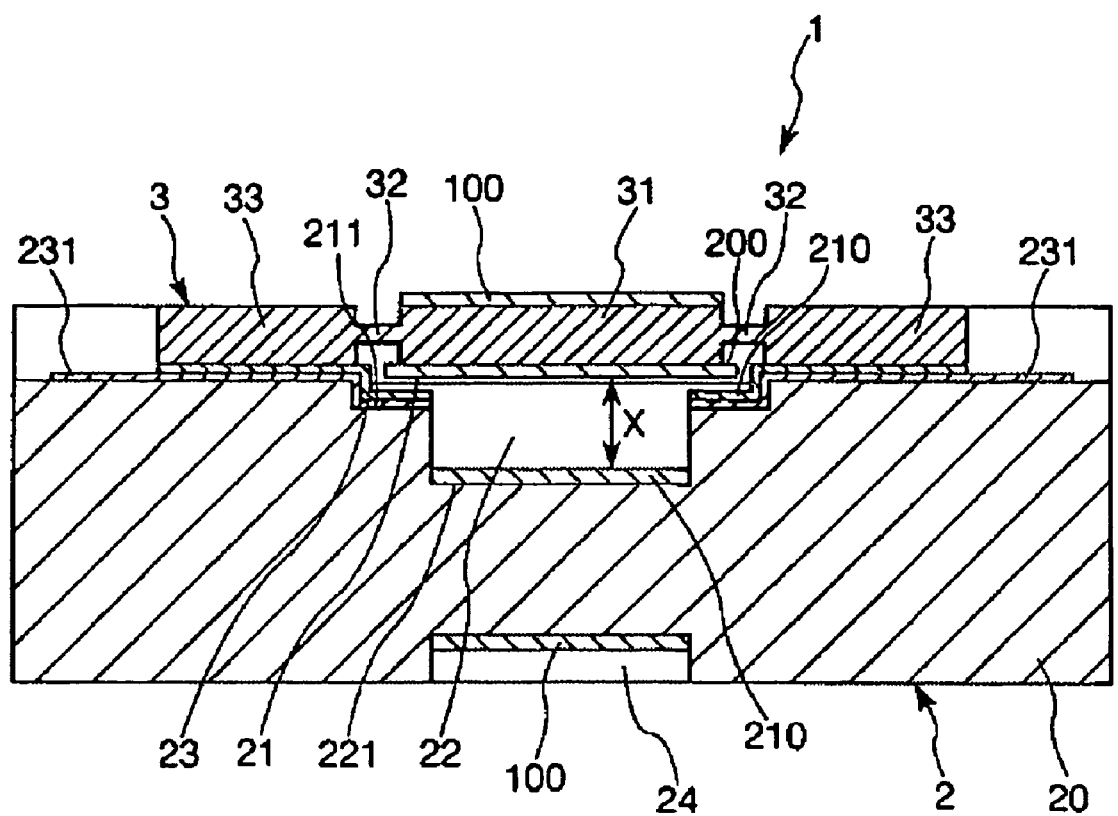
FIG. 9 is a sectional view of the optical tunable filter according to a third embodiment of the present invention.

As shown in FIG. 9, in the optical tunable filter 1 of the third embodiment, a center location of the movable part 31 and the conducting part 33 are coupled to the supporting member 32. A manufacturing method is described below.

Manufacturing Method

Figure 10:
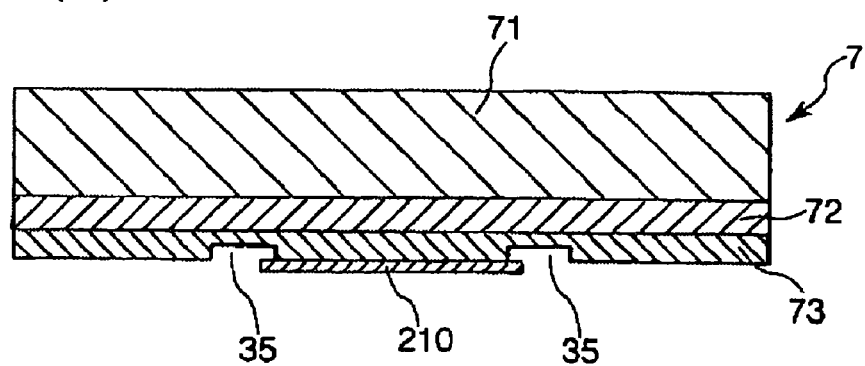
FIGS. 10a and 10b show steps for manufacturing the optical tunable filter according to the third embodiment of the present invention.
Figure 10:
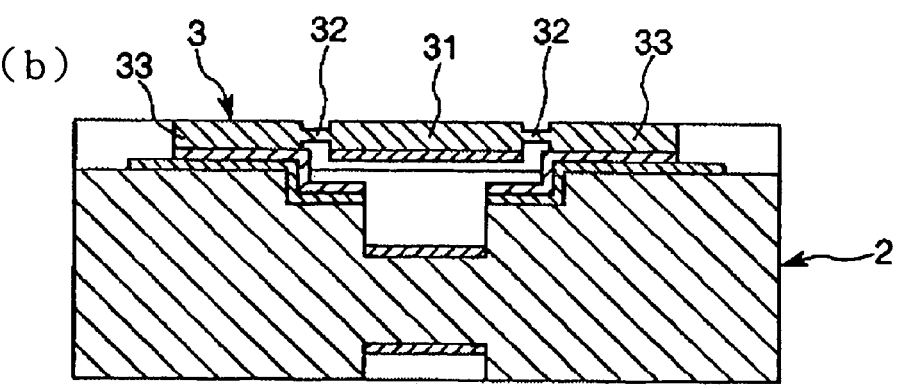

FIGS. 10a and 10b are figures for explaining the manufacturing method of the third embodiment (schematically showing manufacturing processes). A feature of the manufacturing method according to the third embodiment is that the supporting member is made thin by processing from the upper side and the lower side of the supporting member. The manufacturing processes are the same as those of the first embodiment except process <9>" is added after process <9> in step (2) and process <13> in step (4) is different.

Process <9>" in step (2) and process <13> in step (4) are now described.

<9>" A photoresist pattern (not shown in the figures) is formed on the undersurface of the second Si layer 73 by photolithography and two-tiered anisotropic dry etching is performed in the same way as process <13> of the first embodiment. The shape (planer shape) of the photoresist pattern corresponds to the shape (planer shape) of the supporting member 32. The thickness (depth) of the etching corresponds to the thickness of the supporting member 32. In other words, a depth of the concave portion 35 corresponds to a depth of a part which is going to be left as the supporting member 32. After etching, the photoresist pattern is removed by, for example, using oxygen plasma. Then, the concave portion 35 shown in FIG. 10a is obtained.

<13> In the manufacturing process of the third embodiment, a photoresist pattern (not shown in the figures) is formed on the upper surface of the second Si layer 73 such that the part that is going to be the first substrate 3 is left remaining. Then, the supporting member 32 is formed by a single etching as shown in FIG. 10b.

The third embodiment has the same effects as those of the first embodiments.

Moreover, according to the optical tunable filter 1 of the third embodiment, the movable part 31 can be more stably moved than that of the first embodiment since the supporting member 32 is coupled to the movable part 31 and the conducting part 33 at its center.

As described above, according to the present invention, the manufacturing processes can be simplified since a release hole is not necessary when the movable part is formed. Moreover, according to the present invention, the drive voltage can be lowered without decreasing the area to which the coulomb force acts.

In the embodiments described above, the antireflection film 100, the first reflection film 200 and the second reflection film 210 are made of insulating films.

In this way, adhesion (a bond between the movable part 31 and the drive electrode 23) can be prevented and a reliable insulating structure can be formed.

Furthermore, the optical tunable filter of high precision can be easily manufactured since the first substrate and the second substrate are formed by etching. Particularly, the thickness of the supporting member can be easily made to have an intended thickness and it can be driven by a low voltage.

Moreover, the movable part does not need to be a thin film because only the supporting member is made to have the intended thickness, and it can adequately prevent the movable part from being warped by the antireflection film formed on the movable part or the high reflection film.

Furthermore, the thickness of the supporting member can be changed by various methods since the optical tunable filter is made by joining the first substrate and the second substrate.

Although the optical tunable filter of the present invention has been fully described by way of an example with reference to the accompanying drawings, it should be understood that the present invention is not limited to the above-described embodiments and various changes and modifications are possible. Each structure or configuration may be replaced by others having the same function. Also, other structures may be added to the present invention.

In the above-described embodiments, although the antireflection film 100, the first reflection film 200 and the second reflection film 210 also serve as insulating films, the configuration is not limited to this. For example, an insulating film may be separately provided. In that case, a $SiO_2$ layer made by thermal oxidation or Tetraethyl Orthosilicate (TEOS)-CVD may be used as the insulating film.

In the above-described embodiments, although only the thickness of the supporting member is thinner than that of the movable part, the configuration is not limited to this. For example, the thickness of the supporting member and the conducting part may be smaller than that of the movable part.

What is claimed is:

1. An optical tunable filter, comprising:
   a first substrate having light transmission properties and having a movable part and a supporting member that movably supports the movable part and having a smaller thickness than a thickness of the movable part;
   a second substrate having light transmission properties and opposed to the first substrate;
   a first gap and a second gap provided on the second substrate;
   an interference part causing interference between the movable part and the second substrate through the second gap;

a drive member changing an interval of the second gap by moving the movable part to the second substrate by making use of the first gap;

a first concave portion formed in a face of the second substrate opposed to the movable part; and a second concave portion, having a larger depth than a depth of the first concave portion, said second concave portion is formed in the face of the second substrate, wherein the first gap and the second gap are formed between an upper surface of the second substrate and a lower surface of the first substrate, the upper surface of the second substrate facing the lower surface of the first substrate.

2. The optical tunable filter according to claim 1, wherein the first concave portion is provided outboard of the second concave portion and is continuous so as to couple to the second concave portion.

3. The optical tunable filter according to claim 1, wherein the drive member moves the movable part with coulomb force.

4. The optical tunable filter according to claim 1, further comprising:

a drive electrode provided on a face of the second substrate corresponding to the first gap.

5. The optical tunable filter according to claim 1, wherein the first gap and the second gap are formed by etching.

6. The optical tunable filter according to claim 1, wherein the first substrate comprises silicon.

7. The optical tunable filter according to claim 1, wherein the movable part is substantially circular form in a plan view.

8. The optical tunable filter according to claim 1, wherein the second substrate comprises a glass.

9. The optical tunable filter according claim 8, wherein the glass contains an alkali metal.

10. The optical tunable filter according to claim 1, further comprising:

a first reflection film provided on a face of the movable part corresponding to the second gap; and a second reflection film provided on the face of the second substrate opposed to the movable part.

11. The optical tunable filter according to claim 10, wherein the first reflection film and the second reflection film comprise multilayer films.

12. The optical tunable filter according to claim 10, wherein the first reflection film comprises an insulating film.

13. The optical tunable filter according to claim 1, further comprising:

an antireflection film provided on at least one of:

a face of the movable part opposed to where the second gap is provided; and a face of the second substrate opposed to where the second gap is provided.

14. The optical tunable filter according to claim 13, wherein the antireflection film comprises a multilayer film.

15. The optical tunable filter according to claim 1, further comprising:

a light incident part provided on the second substrate and making light do at least one of enter and exit to an opposite side to the second gap.

* * * * *